(12) United States Patent
Higuchi et al.

(10) Patent No.: US 8,399,146 B2
(45) Date of Patent: Mar. 19, 2013

(54) FREE-STANDING MEMBRANE ELECTROLYTE ELECTRODE ASSEMBLY

(75) Inventors: Yoshikatsu Higuchi, Wako (JP); Yuji Saito, Wako (JP); Teruaki Komiya, Wako (JP); Ushio Harada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 359 days.

(21) Appl. No.: 12/740,060

(22) PCT Filed: Nov. 27, 2008

(86) PCT No.: PCT/JP2008/071516
§ 371 (c)(1),
(2), (4) Date: Apr. 27, 2010

(87) PCT Pub. No.: WO2009/069685
PCT Pub. Date: Jun. 4, 2009

(65) Prior Publication Data
US 2010/0248073 A1 Sep. 30, 2010

(30) Foreign Application Priority Data
Nov. 27, 2007 (JP) ................... 2007-306337

(51) Int. Cl.
*H01M 8/10* (2006.01)
(52) U.S. Cl. ........ 429/483; 429/482; 429/491; 429/492; 429/528
(58) Field of Classification Search .............. 429/503, 429/509, 520, 528, 529, 482–483, 491–492
See application file for complete search history.

(56) References Cited

U.S. PATENT DOCUMENTS

| | | | |
|---|---|---|---|
| 6,770,395 B2 * | 8/2004 | Virkar et al. ................. | 429/454 |
| 7,125,622 B2 | 10/2006 | Nakayama et al. | |
| 2002/0028367 A1 * | 3/2002 | Sammes et al. ................ | 429/31 |
| 2005/0100770 A1 * | 5/2005 | Sugawara et al. ............ | 429/30 |
| 2008/0268314 A1 * | 10/2008 | Han et al. ...................... | 429/29 |

FOREIGN PATENT DOCUMENTS

| | | |
|---|---|---|
| JP | 9-190825 | 7/1997 |
| JP | 11-71169 | 3/1999 |
| JP | 11-130595 | 5/1999 |

(Continued)

OTHER PUBLICATIONS

International Search Report for Application No. PCT/JP2008/071516, dated Mar. 10, 2009.

*Primary Examiner* — Patrick Ryan
*Assistant Examiner* — Ben Lewis
(74) *Attorney, Agent, or Firm* — Nelson Mullins Riley & Scarborough LLP; Anthony A. Laurentano (57) ABSTRACT

A free-standing membrane electrolyte electrode assembly (ESC) comprises an electrolyte, an anode electrode formed at one end face of the electrolyte, and a cathode electrode formed at the other. The electrolyte is a single crystal having a surface along with oxide ions move or a direction in which the ions move or a polycrystal oriented along a surface along which oxide ions move or in a direction in which the ions move. The surface or the direction is parallel to the thickness direction. The thickness of the electrolyte is 50 to 800 μm and the quotient of the division of the total thickness of the anode electrode and the cathode electrode by the thickness of the electrolyte is 0.1 or less,. The thickness of the ESC is 1 mm or less.

7 Claims, 8 Drawing Sheets

FOREIGN PATENT DOCUMENTS

| | | |
|---|---|---|
| JP | 2003-277024 | 10/2003 |
| JP | 2005-149795 | 6/2005 |
| JP | 2005-149797 | 6/2005 |
| JP | 2005-158377 | 6/2005 |

* cited by examiner

| No. | ELECTROLYTE THICKNESS [μm] | INTERMEDIATE LAYER | | ANODE | CATHODE | OUTPUT POWER [mW/cm$^2$] | |
|---|---|---|---|---|---|---|---|
| | | MATERIAL | THICKNESS | | | 600°C | 700°C |
| EXAMPLE 1 | 300 | SDC | 200 nm | Ni-SDC | $Ba_{0.5}Sr_{0.5}Co_{0.8}Fe_{0.2}O_3$ | 273 | 287 |
| COMPARATIVE EXAMPLE 1 | 5 | GDC | 5 μm | Ni-YSZ | $La_{0.6}Sr_{0.4}Co_{0.8}Fe_{0.2}O_3$ | 80 | 240 |

FIG. 7

| No. | ELECTROLYTE THICKNESS [μm] | INTERMEDIATE LAYER | | ANODE | CATHODE | OUTPUT POWER [mW/cm$^2$] | |
|---|---|---|---|---|---|---|---|
| | | MATERIAL | THICKNESS [nm] | | | 600°C | 700°C |
| EXAMPLE 2 | 300 | SDC | 200 | Ni-SDC | LSCF | 150 | 280 |
| EXAMPLE 3 | 300 | SDC | 200 | Ni-SDC | Ag | 130 | 260 |

FIG. 8

| No. | ELECTROLYTE THICKNESS [μm] | INTERMEDIATE LAYER MATERIAL | INTERMEDIATE LAYER THICKNESS [nm] | ANODE | CATHODE | OUTPUT POWER [mW/cm$^2$] 500°C |
|---|---|---|---|---|---|---|
| EXAMPLE 4 | 300 | SDC | 200 | Pt | Pt | 724 |
| EXAMPLE 5 | 300 | SDC | 200 | 50%Pt-SDC | Pt | 180 |
| EXAMPLE 6 | 300 | SDC | 200 | 75%Pt-SDC | Pt | 294 |
| EXAMPLE 7 | 300 | SDC | 200 | 85%Pt-SDC | Pt | 654 |
| EXAMPLE 8 | 300 | SDC | 200 | 85%Pt-SDC | Pt-SDC | 760 |
| EXAMPLE 9 | 300 | SDC | 200 | 85%Pt-SDC | LSCF | 755 |
| EXAMPLE 10 | 300 | SDC (FORMED ONLY ON CATHODE) | 200 | Pt | Pt | 320 |
| EXAMPLE 11 | 300 | GDC | 200 | Pt | Pt | 205 |
| EXAMPLE 12 | 300 | GDC (FORMED ONLY ON CATHODE) | 200 | Pt | Pt | 211 |
| EXAMPLE 13 | 300 | LDC | 200 | Pt | Pt | 580 |
| EXAMPLE 14 | 300 | LDC (FORMED ONLY ON CATHODE) | 200 | Pt | Pt | 240 |
| COMPARATIVE EXAMPLE 2 | 300 | NONE | | Pt | Pt | 2 |
| COMPARATIVE EXAMPLE 3 | YSZ 5 μm | SDC | 200 | Pt | Pt | 12 |

FREE-STANDING MEMBRANE ELECTROLYTE ELECTRODE ASSEMBLY

Related Applications

This application is a 35 U.S.C. 371 national stage filing of International Application No. PCT/JP2008/071516, filed Nov. 27, 2008, which claims priority to Japanese Patent Application No. 2007-306337 filed on Nov. 27, 2007 in Japan. The contents of the aforementioned applications are hereby incorporated by reference.

TECHNICAL FIELD

The present invention relates to a self-supporting electrolyte-electrode joined assembly (free-standing membrane electrolyte electrode assembly) formed by disposing an electrolyte between an anode and a cathode, the electrolyte being thicker than the anode and the cathode.

BACKGROUND ART

Fuel cells, oxygen sensors, oxygenation membrane devices, and the like have an electrolyte-electrode joined assembly produced by forming an anode and a cathode on surfaces of an oxide ion-conductive electrolyte. In such an assembly, oxygen is ionized on the cathode, and generated oxide ions are transferred through the electrolyte to the anode.

The transfer of oxide ions is activated at a relatively high temperature. The electrolyte-electrode joined assembly must be heated to such a high temperature in order to drive the fuel cell, etc. Thus, the fuel cell cannot produce electric power immediately as needed.

Accordingly, electrolytes composed of substances excellent in oxide ion conductivity, even at relatively low temperatures, have been proposed in recent years. Specifically, such substances include fluorite-type oxides such as scandium-stabilized zirconias (ScSZ) and samarium-doped cerias (SDC), perovskite-type oxides such as lanthanum gallate (LaSrGaMgO), etc. In addition, the applicant has proposed an electrolyte-electrode joined assembly having an electrolyte composed of an apatite-type composite oxide (see, e.g., Patent Document 1).

In these types of electrolytes, it is expected that oxide ion conductivity and electric conductivity can be further increased by reducing the thickness thereof as small as possible. In this case, the oxide ion transfer distance is shortened, and ohmic loss is reduced.

As described in Patent Document 2, in a so-called self-supporting electrolyte-electrode joined assembly, which is produced by forming an electrolyte first and then forming an anode and a cathode on surfaces of the electrolyte, the electrolyte is thicker than the anode and the cathode. When the thickness of the electrolyte is reduced, and thicknesses of the electrodes are excessively reduced, the resultant assembly is poor in strength. Thus, when the thickness of the electrolyte is reduced, the electrodes are made relatively thick so as to obtain sufficient strength.

Patent Document 1: Japanese Laid-Open Patent Publication No. 2005-149795
Patent Document 2: Japanese Laid-Open Patent Publication No. 09-190825

DISCLOSURE OF INVENTION

However, when the electrodes are thickened excessively to obtain sufficient strength, a reaction gas cannot be readily diffused on the electrodes in the fuel cell, etc. Furthermore, during the process of heating or cooling the fuel cell, the electrolyte may become cracked due to a difference in the heat expansion coefficient between the electrolyte and the electrodes. Consequently, in those cases, the power generation of the fuel cell is deteriorated.

A general object of the present invention is to provide a self-supporting electrolyte-electrode joined assembly having sufficient strength.

A principal object of the present invention is to provide a self-supporting electrolyte-electrode joined assembly in which a reaction gas can be readily diffused on an electrode.

According to an aspect of the present invention, there is provided a self-supporting electrolyte-electrode joined assembly comprising an anode and a cathode each of which is formed on a surface of an electrolyte, the electrolyte being thicker than the anode and the cathode, wherein:

the electrolyte comprises a monocrystal having a face or a direction in which an oxide ion is transferred, or a polycrystal oriented along a face or a direction in which an oxide ion is transferred, wherein the face or the direction is parallel to the thickness direction, and the electrolyte has a thickness of 50 to 800 μm, the electrode/electrolyte thickness ratio, obtained by dividing the total thickness of the anode and the cathode by the thickness of the electrolyte, is 0.1 or less, and the total thickness of the anode, the electrolyte, and the cathode is 1 mm or less.

Sufficient strength can be obtained by controlling the thickness of the electrolyte, the total thickness of the electrodes, and the thickness of the self-supporting electrolyte-electrode joined assembly, as described above. Furthermore, since the thicknesses of the electrodes are relatively small, insufficient diffusion of a reaction gas can be prevented on each of the electrodes in a fuel cell, etc.

In the present invention, a substance having anisotropic oxide ion conductivity is used in the electrolyte. The face or direction in which oxide ions are transferred is parallel to the thickness direction, whereby oxide ions can be readily transferred relatively from the cathode to the anode. In other words, the electrolyte has a low internal resistance, and exhibits high conductivity even at relatively low temperatures.

For the above reasons, a fuel cell having a self-supporting electrolyte-electrode joined assembly functions excellently to generate power.

Thus, as described above, by controlling the thickness of the electrolyte, the total thickness of the electrodes, and the thickness of the self-supporting electrolyte-electrode joined assembly within predetermined ranges, the resultant assembly can have sufficient strength and exhibit excellent oxide ion conductivity even at relatively low temperatures.

Since the self-supporting electrolyte-electrode joined assembly is not easily broken, for example, a fuel cell using the assembly can stably produce electric power over a long period. Furthermore, the fuel cell can exhibit sufficient power generation characteristics even at relatively low temperatures.

An apatite-type composite oxide is particularly preferred as a material for the electrolyte having the above properties. The apatite-type composite oxide is high in anisotropic oxide ion conductivity. Therefore, by producing the self-supporting electrolyte-electrode joined assembly, such that the face or direction with high oxide ion conductivity corresponds to the thickness direction, oxide ions can be transferred more readily from the cathode to the anode. In this case, the electrolyte has a lower internal resistance, whereby a fuel cell using the electrolyte also is excellent in terms of power generation characteristics.

A composite material of a metal and an oxide ceramic can preferably be used as a material for the anode. A perovskite-type compound, a fluorite-type compound, or an apatite-type compound can preferably be used as a material for the cathode.

An intermediate layer, which exhibits isotropic oxide ion conduction and has a conductivity lower than that of the electrolyte, preferably is interposed at least between the electrolyte and the anode, or between the electrolyte and the cathode. By forming such an intermediate layer, the number of oxide ions transferred between the electrolyte and the anode, or between the electrolyte and the cathode, can be increased, whereby the interfacial resistance and therefore the internal resistance of the self-supporting electrolyte-electrode joined assembly can be further lowered.

Also, in the case of forming the intermediate layer, the entire self-supporting electrolyte-electrode joined assembly has a thickness of 1 mm or less. In other words, the total thickness of the anode, the electrolyte, the cathode, and the intermediate layer is 1 mm or less.

A fluorite-type compound can preferably be used as a material for the intermediate layer having the above properties.

In any case, preferably, the electrolyte has a conductivity of 0.05 S/cm$^2$ or more at 700° C. in the thickness direction thereof. By using an electrolyte having sufficient conductivity at relatively low temperatures, a fuel cell having sufficient power generation characteristics at such low temperatures can be obtained. Accordingly, the fuel cell can produce electric power in a shorter time.

BEST MODE FOR CARRYING OUT THE INVENTION

A preferred embodiment of a self-supporting electrolyte-electrode joined assembly according to the present invention will be described in detail below with reference to the accompanying drawings.

Figure 1:
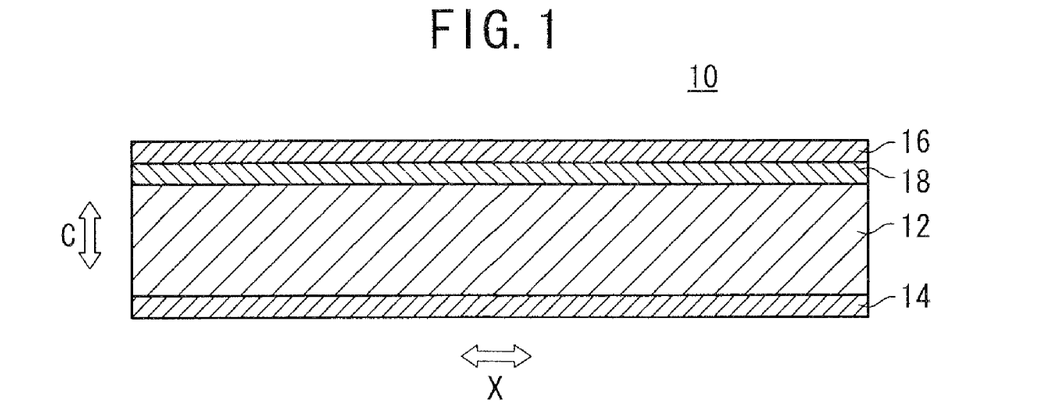
FIG. 1 is an overall, schematic, longitudinal sectional view showing a self-supporting electrolyte-electrode joined assembly according to an embodiment of the present invention.

FIG. 1 is an overall schematic longitudinal sectional view showing a self-supporting electrolyte-electrode joined assembly (hereinafter also referred to as an "ESC") 10 according to the present embodiment. The ESC 10 is produced by forming an anode 14 and a cathode 16 on respective surfaces of an electrolyte 12. An intermediate layer 18 is disposed between the cathode 16 and the electrolyte 12.

In the present embodiment, the electrolyte 12 comprises a monocrystal composed of an apatite-type composite oxide. The monocrystal can be produced by a known monocrystal production method, such as the Czochralski method.

A lanthanum silicon composite oxide having a composition of $La_xSi_6O_{1.5X+12}$ (where $8 \leq X \leq 10$ throughout the following descriptions) is used as an example of the apatite-type composite oxide. The unit cell structure of the composite oxide is described below.

Figure 2:
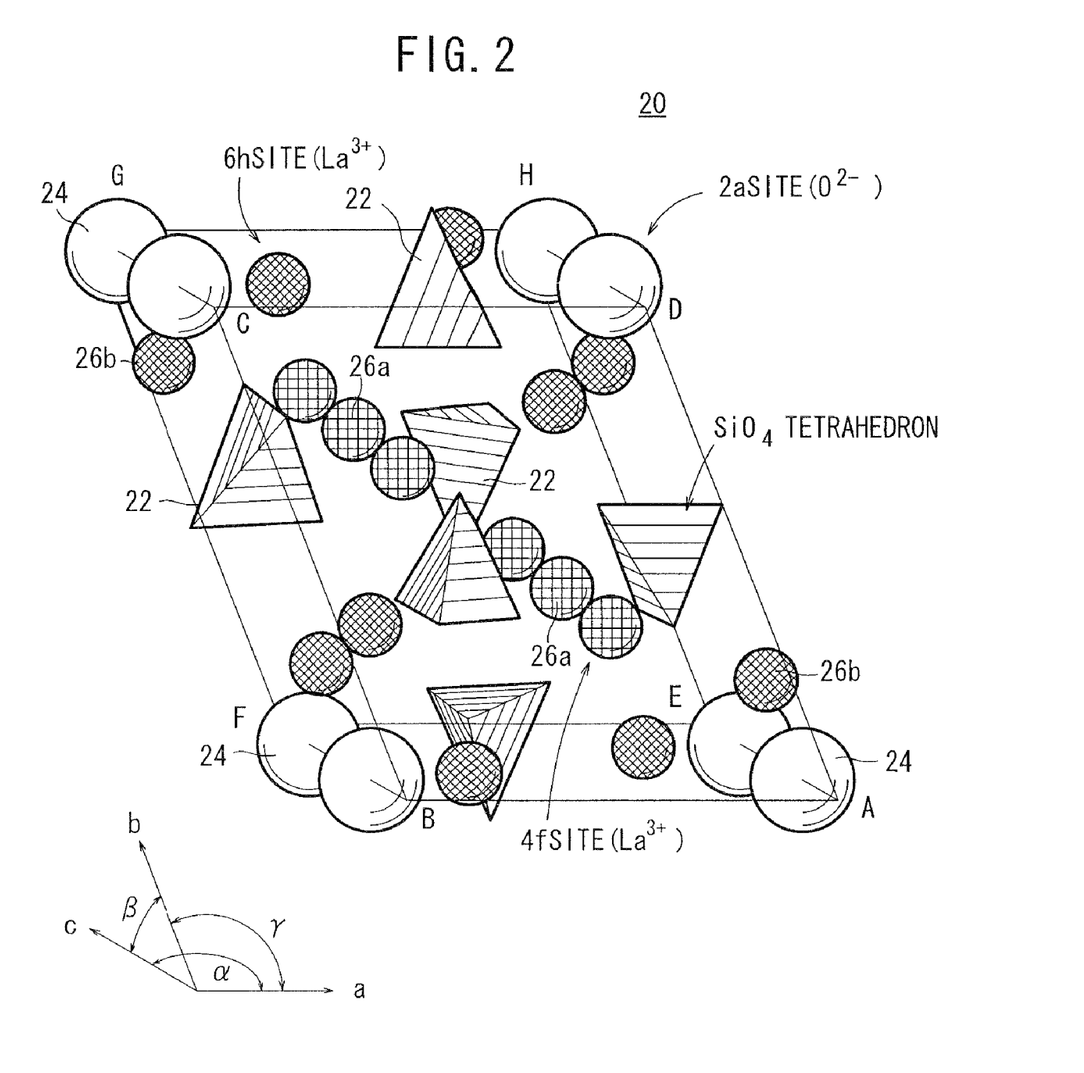
FIG. 2 is a structural view showing a unit cell made of $La_xSi_6O_{1.5X+12}$ observed in a c-axis direction.

The unit cell structure of $La_xSi_6O_{1.5X+12}$ observed in the c-axis direction is shown in FIG. 2. The unit cell 20 has an apatite-type structure, containing six $SiO_4$ tetrahedrons 22, $O^{2-}$ 24 occupying the 2a site, and $La^{3+}$ 26a, 26b occupying the 4f and 6h site. $Si^{4+}$ and $O^{2-}$ in the $SiO_4$ tetrahedrons 22 are not shown.

The unit cell 20 has a hexagonal crystal-like structure. Thus, in the unit cell 20 shown in FIG. 2, the angle α between the side AB in the a-axis direction and the side BF in the c-axis direction, the angle β between the side BC in the b-axis direction and the side BF, and the angle γ between the sides AB and BC are 90°, 90°, 120°, respectively. The length of the side AB is the same as the side BC, and different from the side BF.

It is presumed that $La_xSi_6O_{1.5X+12}$ having such an apatite-type structure can be used as an oxide ion conductor, because the $O^{2-}$ 24 occupying the 2a site is not bonded to the $SiO_4$ tetrahedrons 22 or to the $La^{3+}$ 26a. The force acting on the $O^{2-}$ 24 is not strong, so that the $O^{2-}$ 24 is not fixed in the 2a site, and can be transferred relatively freely in the c-axis direction.

Thus, in each crystal of the electrolyte 12, oxide ions are transferred in the c-axis direction. Therefore, the electrolyte 12 exhibits high oxide ion conductivity in the c-axis direction, while exhibiting low oxide ion conductivity in the a-axis and b-axis directions. In other words, the electrolyte 12 has anisotropic oxide ion conductivity.

In the present embodiment, as shown by the arrow C in FIG. 1, the thickness direction of the electrolyte 12 corresponds to the c-axis direction. The anode 14 and the cathode 16 are perpendicular to the direction in which the electrolyte 12 has the highest oxide ion conductivity, whereby oxide ions can be readily transferred from the cathode 16 to the anode 14.

Thus formed, the electrolyte 12 has a thickness of 50 to 800 μm. When the thickness is less than 50 μm, the electrolyte 12 cannot have sufficient strength for forming the anode 14 and the cathode 16, so that the electrolyte 12 is easily broken, and the ESC 10 cannot be easily produced. On the other hand, when the thickness is more than 800 μm, oxide ions cannot be readily transferred, and ohmic loss is increased, so that the resultant ESC 10 has insufficient power generation characteristics. The thickness of the electrolyte 12 is preferably 100 μm or more.

The electrolyte 12 preferably has a conductivity of 0.05 S/cm$^2$ or more at 700° C., as measured by a direct-current 4-terminal method. The conductivity thereof is more preferably 0.1 S/cm$^2$ or more, and even more preferably 0.3 S/cm$^2$ or more. It should be understood that the conductivity is in the c-axis direction, i.e., the thickness direction of the electrolyte 12 (the direction of the arrow C in FIG. 1).

When the electrolyte 12 exhibits such high conductivity at a relatively low temperature of 700° C., a fuel cell containing the ESC 10 can have excellent power generating characteristics even at low temperatures. Also, the fuel cell can be heated to its driving temperature in a remarkably shorter time period.

In the present embodiment, the anode 14 is composed of a so-called Ni-SDC cermet, which is a composite material produced by co-sintering a metal Ni and an oxide ceramic SDC. Pt, Pt/Co, Ni/Co, or Pt/Rd may be used instead of Ni in the cermet. The anode 14 may be composed solely from such a metal.

The cathode 16 preferably comprises an oxide ceramic such as LaSrCoFeO, BaSrCoFeO, or SmSrCoO, although the cathode 16 may be composed of the same material as the anode 14. Alternatively, the cathode 16 may comprise a cermet of an oxide ceramic and the above metal.

The total thickness of the anode 14 and the cathode 16 is controlled such that a ratio obtained by dividing the total thickness by the thickness of the electrolyte 12 (electrode/electrolyte thickness ratio) is 0.1 or less. For example, when the electrolyte 12 has a thickness of 50 μm or 100 μm, the total thickness of the anode 14 and the cathode 16 is 5 μm or less, or 10 μm or less.

When the total thickness of the anode 14 and the cathode 16 is controlled in this manner, for example, a reaction gas can be readily diffused on the electrodes 14, 16.

The intermediate layer 18 preferably comprises a fluorite-type oxide, specific examples of which include SDC, $Y_2O_3$-doped $CeO_2$ (YDC), $Gd_2O_3$-doped $CeO_2$ (GDC), and $La_2O_3$-doped $CeO_2$ (LDC). Such oxides have isotropic oxide ion conductivity. Thus, the intermediate layer 18 exhibits approximately constant oxide ion conductivity, in both the thickness direction (the C direction in FIG. 1) and the longitudinal direction (the X direction in FIG. 1) thereof. The oxide ion conductivity of the intermediate layer 18 is lower than that of the electrolyte 12 in the thickness direction.

As described below, by forming the intermediate layer 18, the number of oxide ions transferred from the cathode 16 to the electrolyte 12 can be increased, whereby oxide ion conductivity can be increased.

An oxide such as SDC, YDC or GDC acts as a mixed conductor, which exhibits both oxide ion conductivity and electron conductivity. Such a mixed conductor contributes to the aforementioned rapid oxide ion conduction from the cathode 16 to the anode 14, and additionally accelerates oxygen ionization on the cathode 16, and binding of oxide ions to hydrogen (generation of water and electrons) on the anode 14. Thus, the mixed conductor accelerates reactions on the electrodes, thereby improving the power generation function of the fuel cell.

The thickness of the intermediate layer 18 may be approximately 1/1000 that of the electrolyte 12.

The ESC 10 has an overall thickness suitable for ensuring sufficient strength. Specifically, the overall thickness may be 1 mm or less. When the thickness is more than 1 mm, the ESC 10 has a large volume, thus resulting in poor energy efficiency per unit volume.

More preferably, the ESC 10 has a smaller thickness. However, the electrolyte 12 should have a thickness of at least 50 μm, wherein the ESC 10 is thicker than the electrolyte 12. In view of ensuring sufficient strength, the thickness of the ESC 10 is preferably 100 μm or greater, and more preferably 200 μm or greater. Most preferably, the ESC 10 has a thickness of 200 to 600 μm in order to achieve optimum strength and high oxide ion conductivity.

Figure 3:
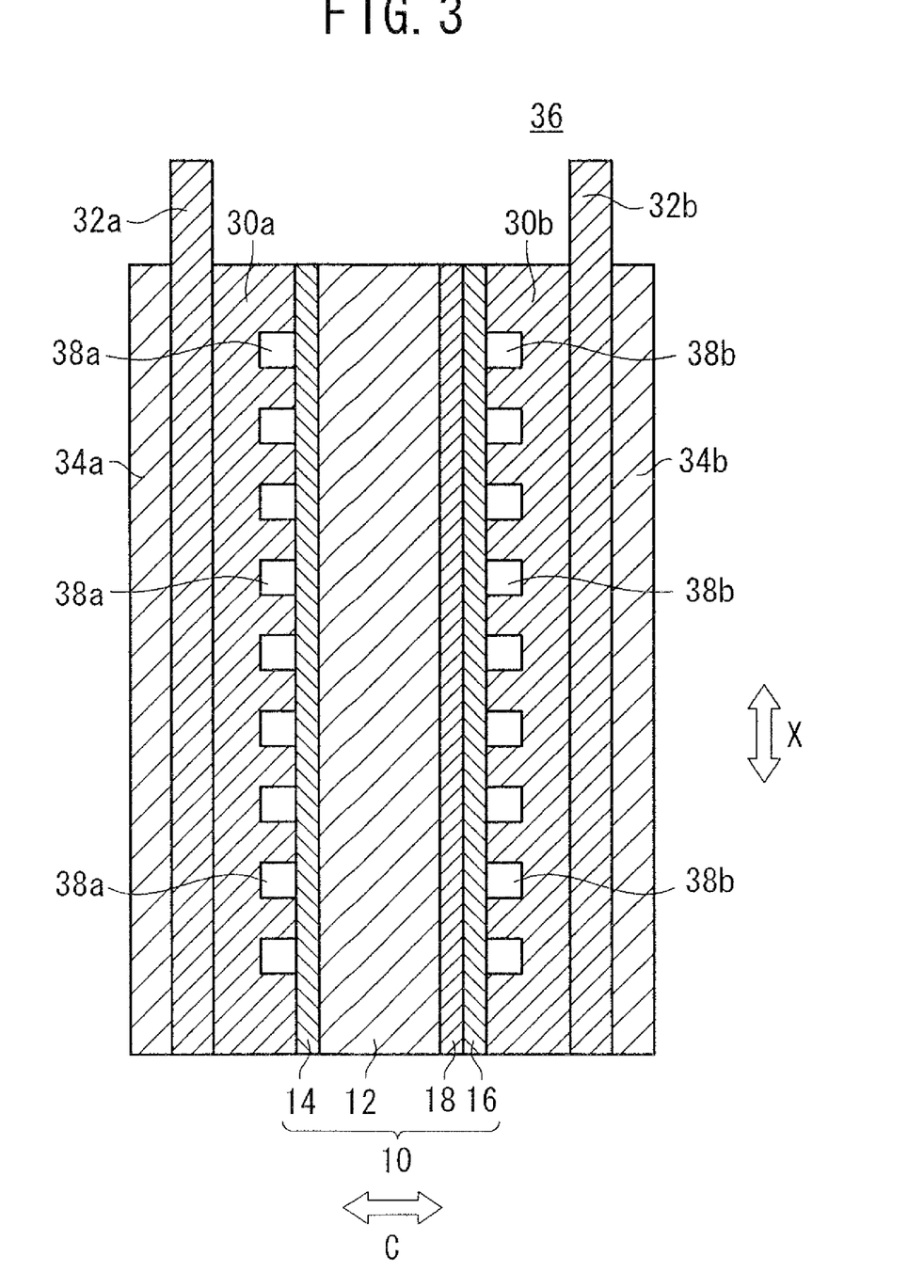
FIG. 3 is a schematic, longitudinal sectional view showing a unit fuel cell using the self-supporting electrolyte-electrode joined assembly of FIG. 1.

When the above ESC 10 is used for forming a unit fuel cell, as shown in FIG. 3, the ESC 10 is interposed between a pair of separators 30a, 30b. Collector electrodes 32a, 32b are disposed outside the separators 30a, 30b, respectively, and end plates 34a, 34b are disposed outside the collector electrodes 32a, 32b, respectively. The end plates 34a, 34b are connected to each other by bolts (not shown), whereby the ESC 10, the separators 30a, 30b, and the collector electrodes 32a, 32b are sandwiched by the end plates 34a, 34b so as to form the unit fuel cell 36. Gas passages 38a, 38b for supplying a fuel gas and an oxygen-containing gas to the anode 14 and the cathode 16 are formed respectively in the separators 30a, 30b.

The unit fuel cell 36 is driven after being heated to a medium temperature of approximately 500° C. to 800° C., preferably 700° C. After heating, the oxygen-containing gas is supplied through the gas passages 38b in the separator 30b, while the hydrogen-containing fuel gas is supplied through the gas passages 38a in the separator 30a.

Oxygen in the oxygen-containing gas is bonded to an electron on the cathode 16 to generate an oxide ion ($O^{2-}$). The generated oxide ion is transferred from the cathode 16 to the electrolyte 12.

Figure 4:
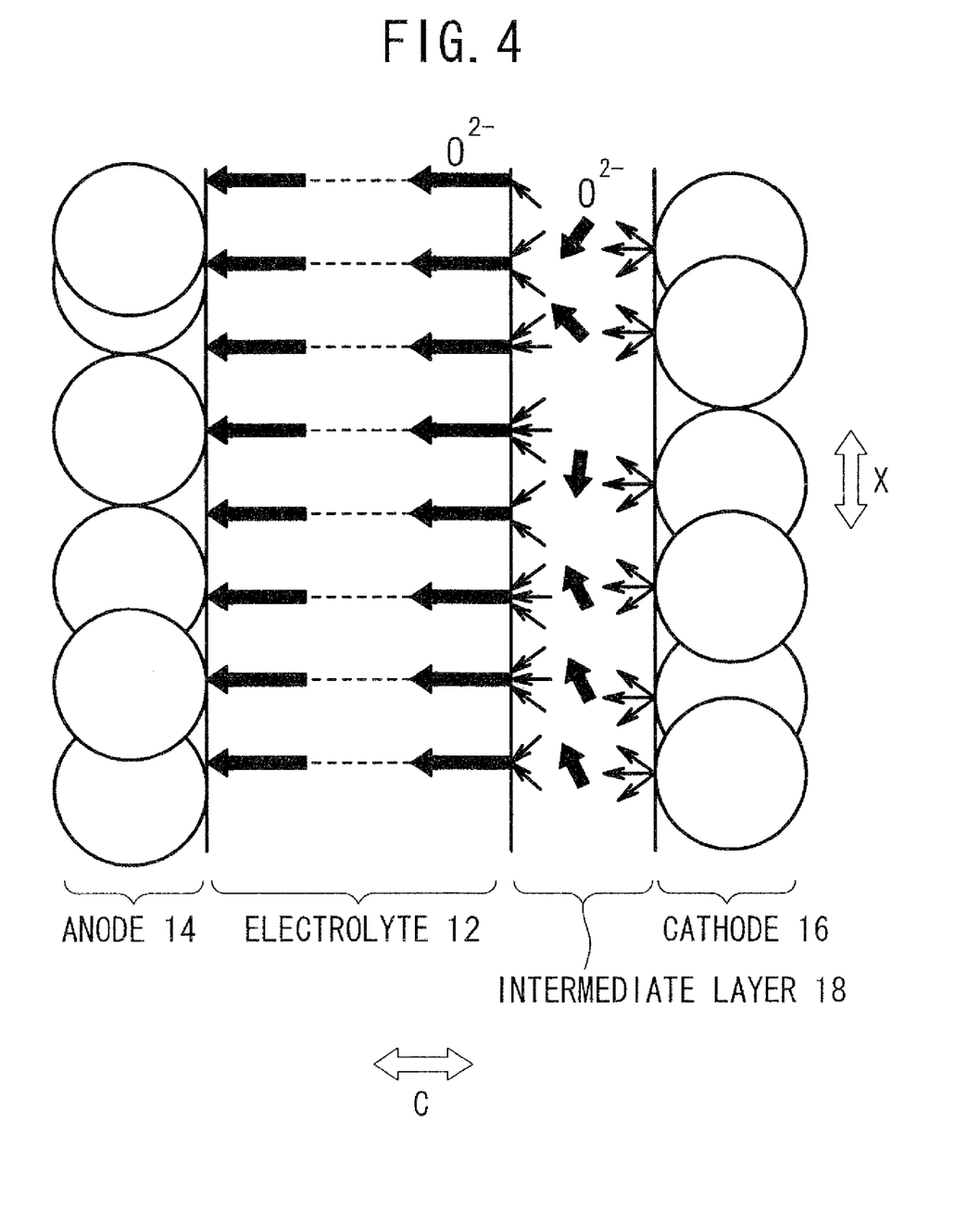
FIG. 4 is a schematic, structural explanatory view showing the electrolyte-electrode joined assembly of FIG. 1.

An ESC 10 having an intermediate layer 18 is shown schematically in FIG. 4. As shown in FIG. 4, oxide ions are transferred from the cathode 16 to the intermediate layer 18, move randomly within the intermediate layer 18, and are introduced to a contact region between the electrolyte 12 and the intermediate layer 18. This is because the intermediate layer 18 comprises the substance having isotropic oxide ion conductivity, such as SDC, YDC, or GDC, as described above. Thus, not only oxide ions that are transferred straightly, but also oxide ions transferred obliquely within the intermediate layer 18, penetrate the electrolyte 12. As a result, the number of the oxide ions introduced into the electrolyte 12 is increased significantly.

As described above, by interposing the intermediate layer 18 between the cathode 16 and the electrolyte 12, the number of oxide ions transferred from the cathode 16 to the electrolyte 12 is increased, so that oxide ion conductivity is improved. Furthermore, in this case, the interfacial resistance between the electrolyte 12 and the cathode 16 is lowered in order to reduce over-voltage.

Oxide ions are further transferred in the electrolyte 12 toward the anode 14. The electrolyte 12 is disposed such that oxide ions can be most readily transferred to the anode 14 in the thickness direction (the direction of the arrow C) thereof. Therefore, oxide ions can be rapidly transferred.

Thus, oxide ion conductivity is increased when a substance having anisotropic oxide ion conductivity (such as an apatite-type composite oxide) is used in the electrolyte 12, and the face or direction in which oxide ions are conducted is parallel to the thickness direction. Oxide ions can be readily transferred in the electrolyte 12 even at relatively low temperatures, whereby the unit fuel cell 36 has satisfactory power generation characteristics at such low temperatures.

The electrolyte 12 is high in oxide ion conductivity, and oxide ion conduction is not prevented, even when the electrolyte 12 is somewhat enlarged to ensure sufficient strength. Therefore, the thickness of the electrodes 14, 16 can be reduced, and the reaction gas can be readily diffused on the electrodes 14, 16.

For the above reasons, the unit fuel cell 36 functions excellently to generate power.

The oxide ions reach the anode 14, and become bonded to hydrogen in the fuel gas supplied to the anode 14. As a result, water and electrons are released. The released electrons are introduced to an external circuit, which is electrically connected to the collector electrodes 32a, 32b. The electrons are used as direct-current (DC) electrical energy for energizing the external circuit, and then become bonded to oxygen supplied to the cathode 16.

In the above reaction mechanism, since the intermediate layer 18 comprises a mixed conductor, such as SDC, YDC, or GDC, ionization on the cathode 16 and water generation on the anode 14 are accelerated. Thus, the unit fuel cell 36 functions excellently in terms of power generation.

The ESC 10 may be produced as follows. First, a crystal of an apatite-type oxide, such as $La_xSi_6O_{1.5X+12}$, is grown such that the crystal growth direction corresponds to the c-axis direction, in order to obtain a monocrystal for the electrolyte 12. Such a crystal growth direction can be achieved by means of the method described in Japanese Laid-Open Patent Publication No. 11-130595, etc.

Then, a paste of SDC, YDC, GDC, etc., is applied to a surface of the monocrystal, the surface being perpendicular to the c-axis direction. Such application may be performed by using a known method, such as a screen printing method. The applied paste is baked so as to form the intermediate layer 18.

A paste of Ni-SDC is applied to the other surface of the electrolyte 12. Such application may be performed using a screen printing method, etc., in the same manner as described above. The paste is baked so as to form an anode 14 of Ni-SDC.

A paste of a perovskite-type, fluorite-type, or apatite-type compound is applied to the surface that is coated with the intermediate layer 18 by means of a screen printing method. The paste is baked so as to form the cathode 16.

Alternatively, the anode 14, the cathode 16, and the intermediate layer 18 may be formed by a gas phase method. Preferred examples of the gas phase method include a sputtering method, a CVD (Chemical Vapor Deposition) method, an ALD (Atomic Layer Deposition) method, and a PLD (Pulsed Laser Deposition) method.

The ESC 10 (see FIG. 1) can be obtained in the foregoing manner. The ESC 10 includes an anode 14 comprising Ni-SDC, an electrolyte 12 comprising a monocrystal of $La_xSi_6O_{1.5X+12}$ or the like (the c-axis direction being parallel to the thickness direction), an intermediate layer 18 comprising SDC, YDC, GDC, or the like, and a cathode 16 comprising the perovskite-type, fluorite-type, or apatite-type compound.

Although, in the above example, the intermediate layer 18 is interposed only between the cathode 16 and the electrolyte 12, the intermediate layer 18 may be formed not only between the cathode 16 and the electrolyte 12, but also between the anode 14 and the electrolyte 12, or the intermediate layer 18 may be formed only between the anode 14 and the electrolyte 12.

The material of the electrolyte 12 is not particularly limited to $La_xSi_6O_{1.5X+12}$, and may comprise any substance, as long as the substance exhibits anisotropic oxide ion conductivity. Examples of suitable substances include other apatite-type oxides, such as $La_xGe_6O_{1.5X+12}$ ($8 \leq X \leq 10$), and layered compounds made up from a series of BIMEVOX compounds.

The electrolyte 12 is not particularly limited to being a monocrystal, and may comprise a sintered body of powder crystals oriented in the c-axis direction. For example, such a sintered body can be obtained by the steps of adding an apatite compound powder to a solvent so as to prepare a slurry, solidifying the slurry under a strong magnetic field of approximately 10 T (tesla), and sintering the obtained solid.

Also, the material of the intermediate layer 18 is not particularly limited to SDC, YDC, and GDC, and may comprise another fluorite or perovskite type oxide, so long as the material exhibits isotropic oxide ion conductivity.

The unit fuel cell 36 can be produced from the ESC 10 by disposing the separators 30a, 30b, the collector electrodes 32a, 32b, and the end plates 34a, 34b, respectively, on surfaces of the anode 14 and the cathode 16.

EXAMPLES

A monocrystal of an apatite compound $La_{9.33}Si_6O_{26}$, oriented in the c-axis direction, was prepared by the Czochralski method. The monocrystal was mirror-polished into a disc having a diameter of 30 mm and a thickness of 300 μm (size in the thickness direction parallel to the c-axis direction). Then, a 200 nm thick SDC layer was formed on each surface of the disc by sputtering. The resultant disc was subjected to heat treatment at 1350° C. for 2 hours in air.

A paste of Ni-SDC was applied to the surface of one of the SDC ($Sm_{0.2}Ce_{0.8}O_{1.9}$) layers by screen printing, and subjected to a heat treatment at 1350° C. for 4 hours in air, so as to form an Ni-SDC ($Sm_{0.2}Ce_{0.8}O_{1.9}$) layer. In the paste, the weight ratio between Ni and SDC was 50:50.

A paste of $Ba_{0.5}Sr_{0.5}Co_{0.8}Fe_{0.2}O_3$ was applied to the surface of the other SDC layer by screen printing, and subjected to a heat treatment at 800° C. for 4 hours in air, in order to form a $Ba_{0.5}Sr_{0.5}Co_{0.8}Fe_{0.2}O_3$ layer.

The ESC of Example 1, which had an electrolyte of $La_{9.33}Si_6O_{26}$, an anode made up of the Ni-SDC layer, a cathode made up of the $Ba_{0.5}Sr_{0.5}Co_{0.8}Fe_{0.2}O_3$ layer, and intermediate layers of the SDC layers being formed between the electrolyte and the anode, and between the electrolyte and the cathode, was produced in the foregoing manner. In the ESC of Example 1, the thickness of the anode and the cathode was 5 μm or less.

A unit fuel cell was produced using the ESC of Example 1. $H_2$ was supplied to the anode at a flow rate of 20 cc/minute, and compressed air was supplied to the cathode at a flow rate of 100 cc/minute, in order to produce electric power. The relationship between current density and voltage at 600° C. and 700° C., respectively, is shown in the graph of FIG. 5 and the table of FIG. 6.

For comparison, a unit fuel cell was produced using a commercially-available electrolyte-electrode joined assembly of Comparative Example 1. Also the relation between the current density and the voltage at 700° C. of the unit fuel cell is shown in FIGS. 5 and 6. In the commercially available product, the thickness of the electrolyte was 5 μm, and the overall thickness of the assembly was about 400 μm.

Figure 5:
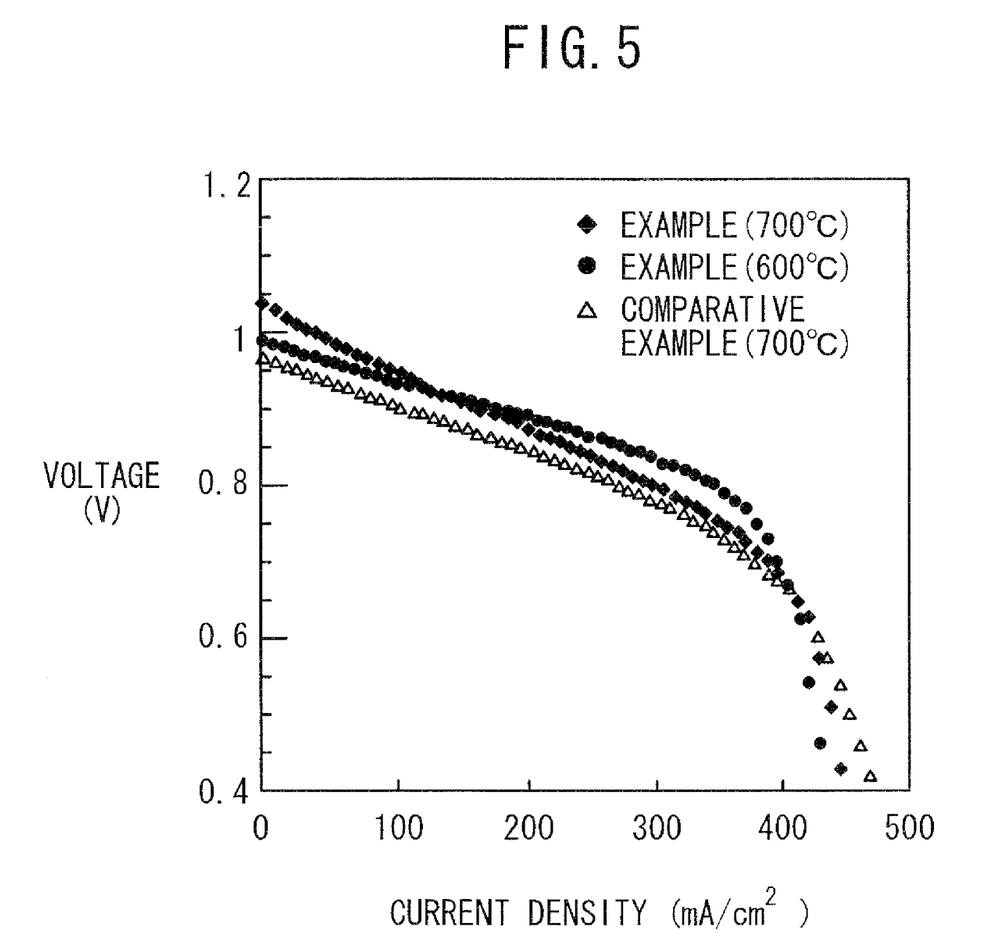
FIG. 5 is a graph showing a relationship between current density and voltage in unit fuel cells according to an Example 1 and a Comparative Example 1.
Figure 6:
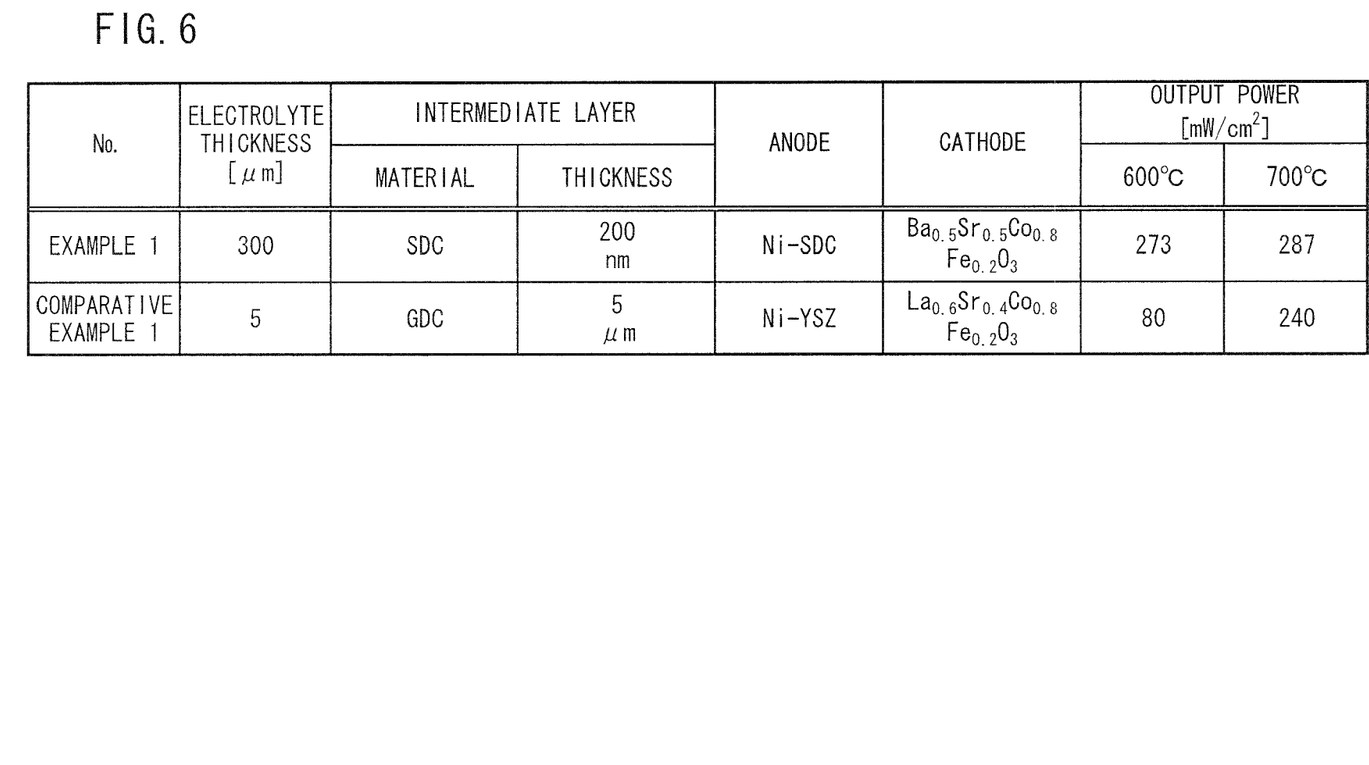
FIG. 6 is a table showing the electrode material, electrolyte thickness, output power, etc., of the unit fuel cells of Example 1 and of Comparative Example 1.

As made clear from FIGS. 5 and 6, the unit fuel cell of Example 1 produces a higher voltage, output power, etc., at a given current density than the cell of Comparative Example 1, even at lower temperatures. In other words, the cell of Example 1 is more excellent in terms of its power generation characteristics.

The ESC of Example 2 was produced in the same manner as Example 1, except that a paste of $La_{0.6}Sr_{0.4}Co_{0.8}F_{0.2}O_3$ (LSCF) was fired at 1000° C. for 4 hours to form a cathode.

Further the ESC of Example 3 was produced in the same manner as Examples 1 and 2, except that a paste of Ag was fired at 800° C. for 4 hours in order to form a cathode.

Figure 7:
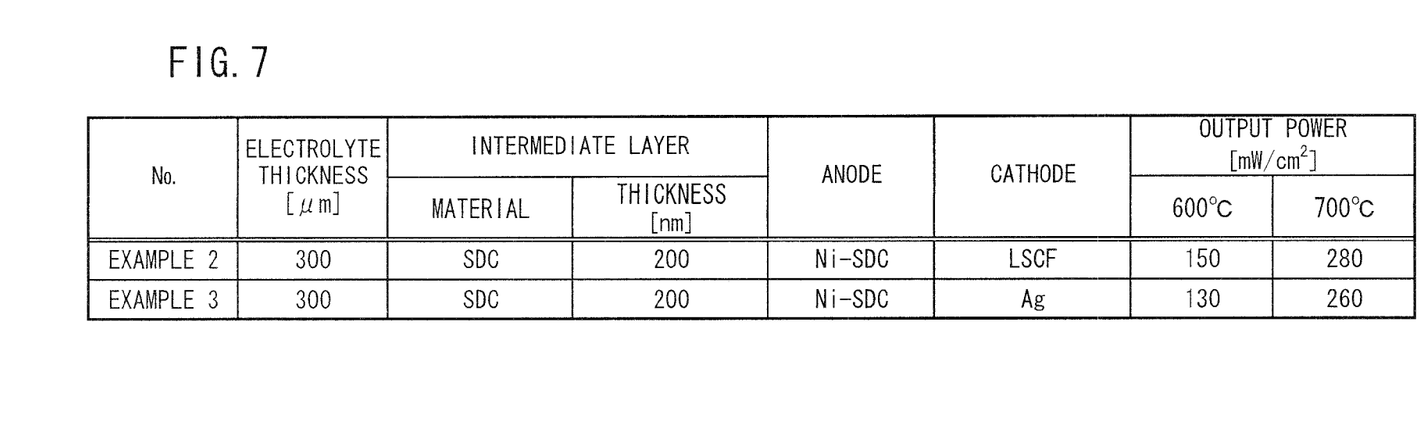
FIG. 7 is a table showing the electrode material, electrolyte thickness, output power, etc., of unit fuel cells according to Examples 2 and 3.

Unit fuel cells were produced using the ESCs of Examples 2 and 3, respectively. In each cell, $H_2$ was supplied to the anode at a flow rate of 20 cc/minute, and compressed air was supplied to the cathode at a flow rate of 100 cc/minute, in order to produce electric power. The output power was measured at 600° C. and 700° C. The results thereof are shown in the table of FIG. 7. It is clear from FIG. 7 that sufficient output power also was obtained in Examples 2 and 3.

A monocrystal of $La_{9.33}Si_6O_{26}$, oriented in the c-axis direction, was mirror-polished into a disc having a diameter of 17 mm and a thickness of 300 μm (size in the thickness direction parallel to the c-axis direction). Then, a 200-nm-thick SDC layer was formed on each surface of the disc by sputtering. The resultant disc was subjected to a heat treatment at 1350° C. for 2 hours in air.

A Pt layer was formed on each of the SDC layers by sputtering, whereby the ESC of Example 4 was produced. The ESC had an electrolyte of $La_{9.33}Si_6O_{26}$, an anode and cathode formed of Pt layers, and intermediate layers made up of SDC layers formed between the electrolyte and the anode, and between the electrolyte and the cathode.

Figure 8:
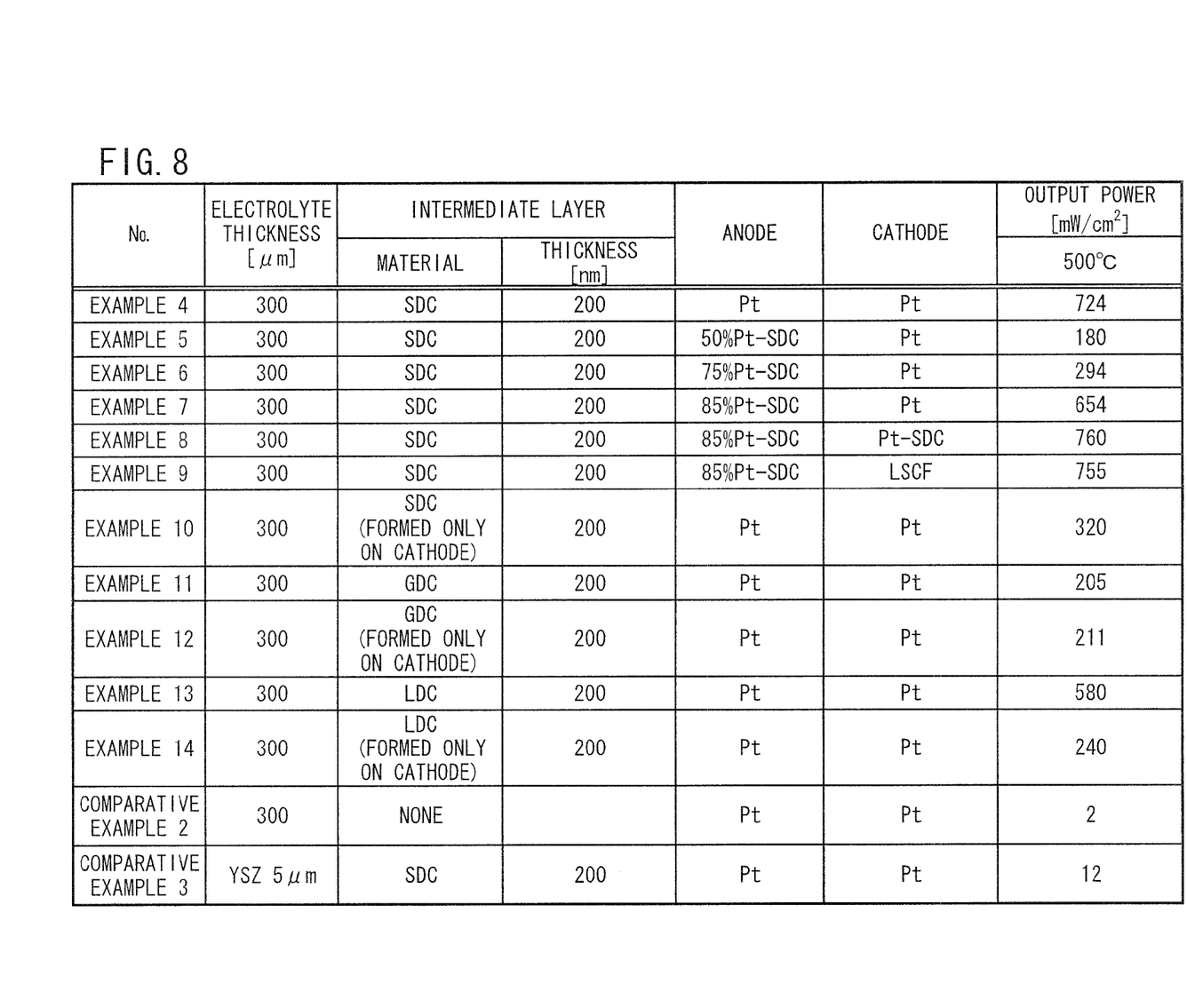
FIG. 8 is a table showing the electrode material, electrolyte thickness, output power, etc., of unit fuel cells according to Examples 4 to 14 and Comparative Examples 2 and 3.

Furthermore, ESCs of Examples 4 to 14 were produced in the same manner, except for using Pt-SDC in the anode, GDC or LDC in the intermediate layer, Pt-SDC or LSCF in the cathode, and forming the intermediate layer only between the cathode and the electrolyte, as shown in FIG. 8.

The term "50% Pt-SDC" in FIG. 8 implies that the Pt content is 50% by weight. Similarly, the terms "75% Pt-SDC" and "85% Pt-SDC" imply that the Pt content is 75% or 85% by weight, respectively. When Pt-SDC or LSCF was used in the electrode, the formed electrode was subjected to a heat treatment at 500° C. for 1 hour.

For comparison, the ESC of Comparative Example 2, having no intermediate layers, and the ESC of Comparative Example 3, having a 5 μm thick YSZ electrolyte, were produced.

Unit fuel cells were produced using the ESCs of Examples 4 to 14 and Comparative Examples 2 and 3, respectively. In each cell, $H_2$ was supplied to the anode at a flow rate of 20 cc/minute, while compressed air was supplied to the cathode at a flow rate of 100 cc/minute, in order to produce electric power. The output power was measured at 500° C. The results are shown in FIG. 8. As made clear from FIG. 8, in the case of using an electrolyte having excellent oxide ion conductivity, and interposing the intermediate layer between the electrolyte and electrode, the resultant fuel cell can exhibit excellent power generation characteristics even when the electrolyte has a large thickness.

The invention claimed is:

1. A self-supporting electrolyte-electrode joined assembly comprising an anode and a cathode, each of which is formed on a surface of an electrolyte, the electrolyte being thicker than the anode and the cathode, wherein:
   the electrolyte comprises a monocrystal having a face or a direction in which an oxide ion is transferred, or a polycrystal oriented along a face or a direction in which an oxide ion is transferred, wherein the face or the direction is parallel to the thickness direction, and the electrolyte has a thickness of 50 to 800 μm
   an electrode/electrolyte thickness ratio, obtained by dividing the total thickness of the anode and the cathode by the thickness of the electrolyte, is 0.1 or less, and
   the total thickness of the anode, the electrolyte, and the cathode is 1 mm or less.

2. A self-supporting electrolyte-electrode joined assembly according to claim 1, wherein the electrolyte comprises an apatite-type composite oxide.

3. A self-supporting electrolyte-electrode joined assembly according to claim 1, wherein the anode comprises a composite material of a metal and an oxide ceramic.

4. A self-supporting electrolyte-electrode joined assembly according to claim 1, wherein the cathode comprises a perovskite-type compound, a fluorite-type compound, or an apatite-type compound.

5. A self-supporting electrolyte-electrode joined assembly according to claim 1, further comprising an intermediate layer between the electrolyte and at least one of the anode and the cathode, wherein:
   the intermediate layer exhibits an isotropic oxide ion conduction, and has a conductivity lower than that of the electrolyte, and
   the total thickness of the anode, the electrolyte, the cathode, and the intermediate layer is 1 mm or less.

6. A self-supporting electrolyte-electrode joined assembly according to claim 5, wherein the intermediate layer comprises a fluorite-type compound.

7. A self-supporting electrolyte-electrode joined assembly according to claim 1, wherein the electrolyte has a conductivity of 0.05 $S/cm^2$ or more at 700° C. in the thickness direction.

* * * * *